(12) United States Patent
Zula et al.

(10) Patent No.: US 8,935,069 B2
(45) Date of Patent: Jan. 13, 2015

(54) SYSTEM AND METHOD FOR TRANSMITTING A TIRE PRESSURE STATUS SIGNAL TO A VEHICLE ECU

(71) Applicant: Bendix Commercial Vehicle Systems LLC, Elyria, OH (US)

(72) Inventors: Daniel P. Zula, North Ridgeville, OH (US); David J. Taneyhill, Elyria, OH (US); Timothy J. Frashure, Columbia Station, OH (US)

(73) Assignee: Bendix Commercial Vechicle Systems LLC, Elyria, OH (US)

( * ) Notice: Subject to any disclaimer, the term of this patent is extended or adjusted under 35 U.S.C. 154(b) by 0 days.

(21) Appl. No.: 13/781,061

(22) Filed: Feb. 28, 2013

(65) Prior Publication Data

US 2014/0244124 A1     Aug. 28, 2014

(51) Int. Cl.
*G06F 7/70* (2006.01)
*B60C 23/04* (2006.01)

(52) U.S. Cl.
CPC ................................ *B60C 23/0408* (2013.01)
USPC ............................................. 701/70; 340/438

(58) Field of Classification Search
CPC ................................ B60C 23/00; G05B 19/00
USPC .............................. 701/70; 340/442, 447, 438
See application file for complete search history.

(56) References Cited

U.S. PATENT DOCUMENTS

| | | | |
|---|---|---|---|
| 5,473,938 A | 12/1995 | Handfield et al. | |
| 6,229,434 B1 | 5/2001 | Knapp et al. | |
| 6,535,116 B1 | 3/2003 | Zhou | |
| 6,885,282 B2 | 4/2005 | Desai et al. | |
| 6,972,671 B2 | 12/2005 | Normann et al. | |
| 7,026,953 B2 | 4/2006 | Fujii | |
| 7,382,239 B2 | 6/2008 | Song et al. | |
| 7,639,122 B2 | 12/2009 | Kochie et al. | |
| 7,729,813 B2 | 6/2010 | Frashure | |
| 7,739,010 B2* | 6/2010 | Koo ................................ 701/37 |

(Continued)

FOREIGN PATENT DOCUMENTS

| | | |
|---|---|---|
| CN | 201484087 U | 5/2010 |
| CN | 201484088 U | 5/2010 |

(Continued)

OTHER PUBLICATIONS

SmarTire Tire Pressure Monitoring System by Bendix CVS Operator's Manual, BW2799, 2010 Bendix Commercial Vehicle Systems LLC, a member of the Knorr-Bremse Group.

(Continued)

*Primary Examiner* — Thomas G Black
*Assistant Examiner* — Luke Huynh
(74) *Attorney, Agent, or Firm* — Brian E. Kordas; Eugene E. Clair; Cheryl L. Greenly

(57) ABSTRACT

A dash switch module for a vehicle includes a controller transmitting a parking brake control request message to a vehicle ECU, a signal receiving component receiving a transmitted status signal from a sensor on the vehicle indicating a status of a vehicle component, and a processor receiving the transmitted status signal from the signal receiving component. The processor generates a dash switch module signal based on the transmitted status signal. The processor transmits the dash switch module signal to the vehicle electronic control unit.

29 Claims, 3 Drawing Sheets

(56) References Cited

U.S. PATENT DOCUMENTS

| | | |
|---|---|---|
| 7,893,821 B2 | 2/2011 | Huang |
| 7,952,472 B2 | 5/2011 | Okada et al. |
| 7,994,993 B2 | 8/2011 | Huang |
| 8,009,027 B2 * | 8/2011 | Thomas et al. ............... 340/447 |
| 8,049,606 B2 | 11/2011 | Braun et al. |
| 2003/0038716 A1 | 2/2003 | Piesinger |
| 2006/0071766 A1 | 4/2006 | O'Brien et al. |
| 2007/0027930 A1 | 2/2007 | Alvarado et al. |
| 2007/0164876 A1 | 7/2007 | Ostrander et al. |
| 2008/0100429 A1 | 5/2008 | Luo et al. |
| 2008/0117036 A1 | 5/2008 | Kenny et al. |
| 2008/0150712 A1 | 6/2008 | Cooprider et al. |
| 2008/0164988 A1 | 7/2008 | DeKeuster et al. |
| 2009/0109012 A1 | 4/2009 | Petrucelli |
| 2009/0153317 A1 | 6/2009 | Kim |
| 2010/0148949 A1 | 6/2010 | McQuade et al. |
| 2010/0148986 A1 | 6/2010 | Aunkofer et al. |
| 2010/0207753 A1 | 8/2010 | Sugiura |
| 2010/0305779 A1 | 12/2010 | Hassan et al. |
| 2010/0317337 A1 | 12/2010 | Chakam |
| 2011/0106464 A1 | 5/2011 | Petrucelli |

FOREIGN PATENT DOCUMENTS

| | | |
|---|---|---|
| EP | 1530048 A1 | 5/2005 |
| JP | 200335331 A | 12/2000 |
| WO | 2010130737 A1 | 11/2010 |

OTHER PUBLICATIONS

SmarTire Tire Pressure Monitoring System by Bendix CVS; SmarTire TPMS Maintenance Hand Tool User Manual, BW2809, 2010 Bendix Commercial Vehicle Systems LLC.

* cited by examiner

SYSTEM AND METHOD FOR TRANSMITTING A TIRE PRESSURE STATUS SIGNAL TO A VEHICLE ECU

BACKGROUND

The present invention relates to monitoring conditions of a vehicle. It finds particular application in conjunction with monitoring tire conditions of a vehicle and will be described with particular reference thereto. It will be appreciated, however, that the invention is also amenable to other applications.

It is becoming more common in modern motor vehicles to monitor statuses of various vehicle systems. For example, a tire pressure monitoring system (TPMS) monitors various conditions (e.g., inflation pressure, temperature, etc) for tires on the vehicle. If any of the conditions becomes outside of a predetermined range, corrective actions may be taken to address the out-of-range condition. Maintaining the correct tire conditions helps maintain safe, efficient, and economical operation of the vehicle. Abnormal tire conditions may result in excessive tire wear, blow-outs, and poor fuel mileage.

Current TPMS's typically require multiple antennae placed in various locations on the vehicle. The antennae receive radio-frequency (RF) signals transmitted from different sensors associated with respective tires on the vehicle. The placement and required number of the antennae in current TPMS's results in at least some of the antennae unprotected from environmental conditions. For example, some TPMS's currently include a stand-alone antenna mounted on an unprotected front axle.

The present invention provides a new and improved apparatus and method which addresses the above-referenced problems.

SUMMARY

In one embodiment, a dash switch module for a vehicle includes a controller transmitting a parking brake control request message to a vehicle ECU, a signal receiving component receiving a transmitted status signal from a sensor on the vehicle indicating a status of a vehicle component, and a processor receiving the transmitted status signal from the signal receiving component. The processor generates a dash switch module signal based on the transmitted status signal. The processor transmits the dash switch module signal to the vehicle electronic control unit.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
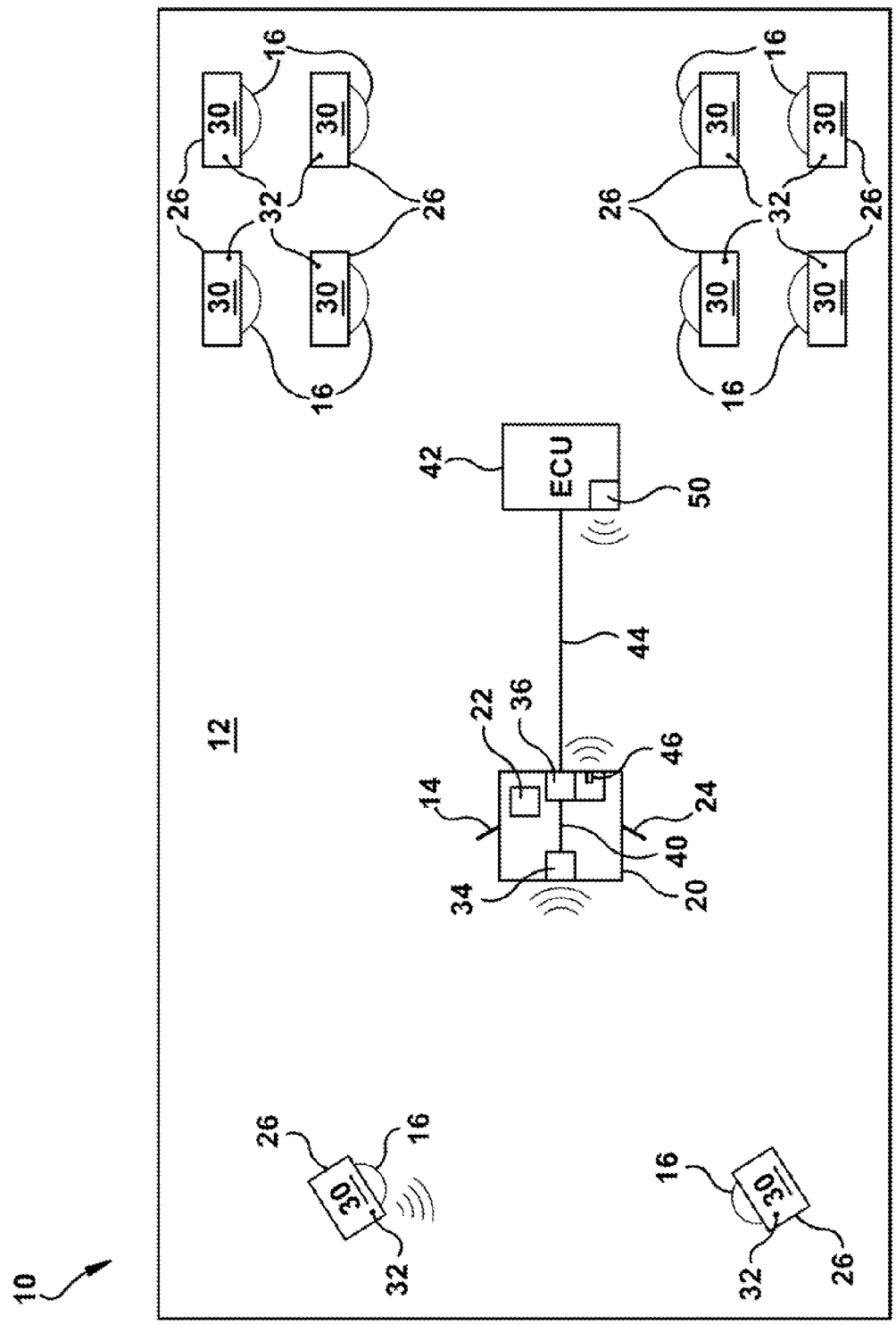
FIG. 1 illustrates a schematic representation of an exemplary vehicle including a tire pressure monitoring system (TPMS) in accordance with one embodiment of an apparatus illustrating principles of the present invention.

With reference to FIG. 1, a simplified component diagram of an exemplary vehicle 10 including a tire pressure monitoring system (TPMS) is illustrated in accordance with one embodiment of the present invention. In one embodiment, the vehicle 10 includes both a tractor 12 and a trailer (not shown). The vehicle 10 includes a switch 14 controlled by an operator of the vehicle 10 for activating and deactivating a vehicle brake 16. For example, the brake 16 activated/deactivated by the switch 14 may be parking brakes on the tractor 12 of the vehicle 10. In one embodiment, the switch 14 is included on a dashboard of the vehicle 10 so that it is within reach of the vehicle operator.

It is contemplated that the switch 14 may be part of a dash switch module 20. In this case, the dash switch module 20 includes a parking brake controller 22 for controlling the brakes 16 (e.g., parking brakes) on the tractor 12 of the vehicle 10 and for controlling brakes (e.g., parking brakes) on the trailer of the vehicle 10. In some embodiments, control of the parking brakes is accomplished through an electronic control unit (ECU) (see, for example, the electronic control unit ECU 42 described below), in which case the dash switch module 20 transmits a parking brake request message. In those embodiments, the vehicle does not have to dedicated "controller" for the brakes. In the illustrated embodiment, the switch 14 may activate the controller 22 for engaging and disengaging the brakes 16 on the tractor 12 of the vehicle 10, while a second switch 24 on the dash switch module 20 may activate the controller 22 for engaging and disengaging brakes (not shown) (e.g., parking brakes) on the trailer of the vehicle 10.

The vehicle 10 includes various components. For example, the tractor 12 of the vehicle 10 includes wheels 26, which, in turn, include respective tires 30. At least one of the tires 30 includes a tire sensor 32 that senses at least one status of the respective tire 30. For example, the at least one tire sensor 32 senses at least one of a pressure, temperature, etc. of the respective tire 30. In the illustrated embodiment, the at least one tire sensor 32 is positioned inside the respective tire 30. In the embodiments in which the at least one tire sensor 32 is positioned inside the respective tire 30, the at least one tire sensor 32 includes a transmitter for wirelessly transmitting radio-frequency (RF) signals indicating the at least one status of the respective tire 30. The RF signals transmitted from the at least one tire sensor 32 are referred to as respective status signals.

The dash switch module 20 includes a signal receiving component 34. The signal receiving component 34 receives the RF status signals from the at least one tire sensor 32. In one embodiment, the signal receiving component 34 is an antenna. The signal receiving component 34 (e.g., antenna) acts as a means for receiving the transmitted status signal from the sensor 32. In fact, the signal receiving component 34 (e.g., antenna) acts as a means for wirelessly receiving the transmitted status signal from the sensor 32. As discussed above, the status signals indicate at least one status of the respective tire 30. For example, a status signal may indicate the pressure, temperature, etc. of the respective tire 30. It is also contemplated that the status signal indicates which one of the at least one tire sensors 32 transmitted the signal.

The dash switch module 20 also includes a processor 36. The processor 36 electrically communicates with the signal receiving component 34 via, for example, a wired connection 40. It is also contemplated in other embodiments that the processor 36 wirelessly communicates with the signal receiving component 34. The signal receiving component 34 transmits the status signal to the processor 36. In one embodiment, the dash switch module 20 is positioned in the vehicle dashboard, or proximate to the vehicle dashboard, so as to be high enough out of a metal frame of the vehicle to receive the TPMS signals, but not so far away to be out of range from receiving the front wheel TPMS signals.

After receiving the status signal, the processor 36 generates a dash switch module signal. In one embodiment, the dash switch module signal is a J1939 formatted signal message. It is further contemplated that the dash switch module signal is a proprietary formatted signal message. The dash switch module signal is based on the status signal. In addition, since the status signal includes an identifier indicating the tire 30 associated with the sensor 32 that transmitted the status signal, the dash switch module signal message is also contemplated to include an identifier of the sensor 32 that transmitted the status signal and, therefore, the tire 30 with which the status is associated.

The processor 36 transmits the dash switch module signal message to a vehicle electronic control unit (ECU) 42 (e.g., brake controller). In one embodiment, the vehicle ECU 42 controls service braking functions on the vehicle and, in one example, is an anti-lock braking system ECU. It is contemplated that the processor 36 transmits the dash switch module signal message to the vehicle ECU via a wired connection 44. In one example, the wired connection 44 is a vehicle communication bus that transmits J1939 formatted signal messages and/or proprietary formatted signal messages. The vehicle ECU 42 receives the dash switch module signal message from the processor 36. Although the vehicle ECU 42 is illustrated as being internal to the dash switch module 20, it is also contemplated in other embodiments that the vehicle ECU 42 external to the dash switch module 20.

It is to be understood that the processor 36 may also transmit the dash switch module signal message to the vehicle ECU 42 wirelessly. Therefore, a processor antenna 46 and an ECU antenna 50 are illustrated. While both the wired connection 44 and the wireless connection (e.g., the processor antenna 46 and an ECU antenna 50) may be included between the processor 36 and the vehicle ECU 42, typically only either the wired connection 44 or the wireless connection (e.g., the processor antenna 46 and an ECU antenna 50) is used. Either one or both of the wired connection 44 and the wireless connection (e.g., the processor antenna 46 and an ECU antenna 50) may be considered means for transmitting and/or receiving the dash switch module signal message between the processor 36 and the vehicle ECU 42.

Figure 2:
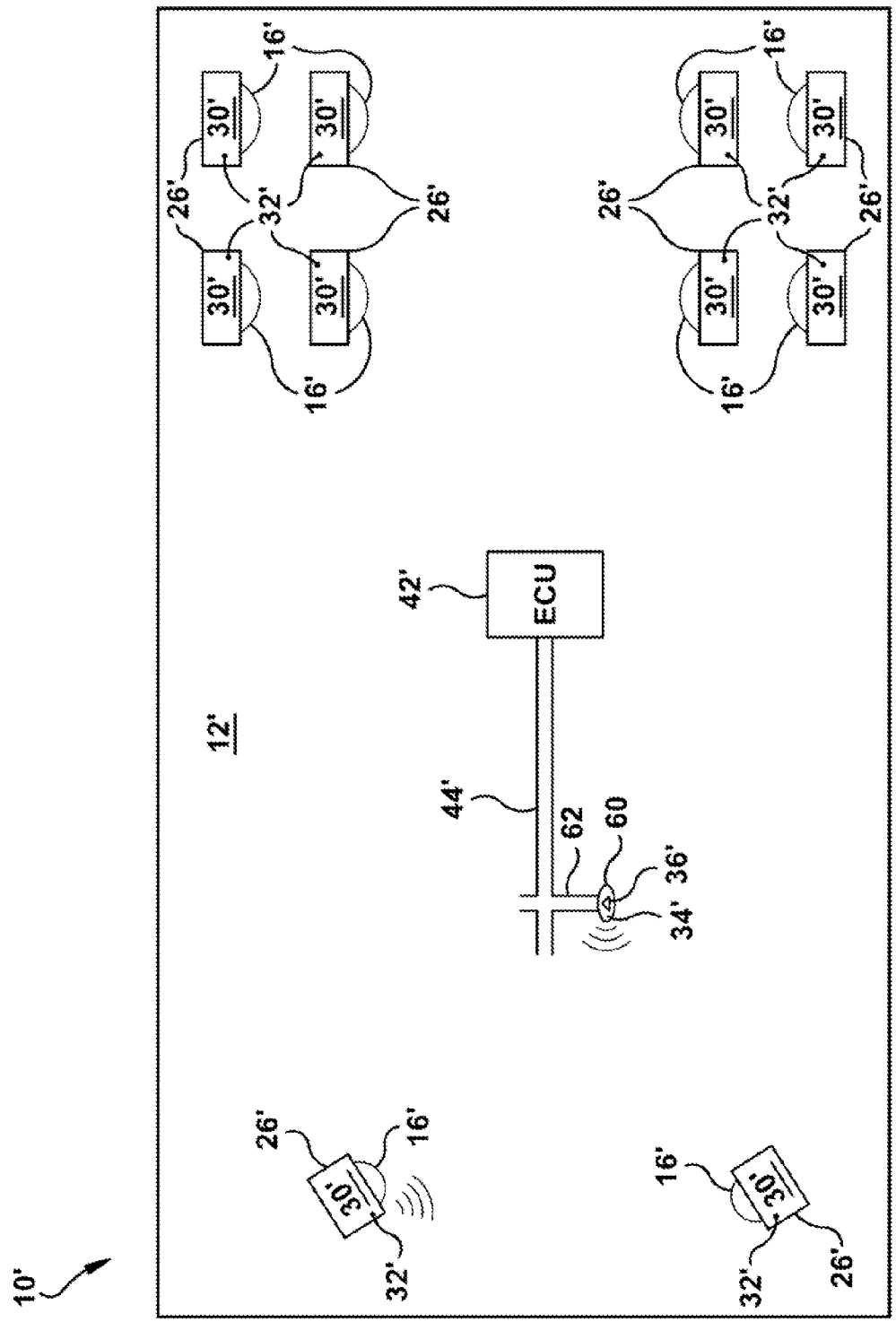
FIG. 2 a schematic representation of an exemplary vehicle including the tire pressure monitoring system (TPMS) in accordance with another embodiment of an apparatus illustrating principles of the present invention.

With reference to FIG. 2, a simplified component diagram of an exemplary vehicle 10' including a tire pressure monitoring system (TPMS) is illustrated in accordance with a second embodiment of the present invention. For ease of understanding this embodiment of the present invention, like components are designated by like numerals with a primed (') suffix and new components are designated by new numerals.

A remote electronic unit (REU) 60 is removably and electrically connected to a diagnostic port 62 (e.g., an electronic connector) on the 10'. The vehicle communication bus 44' also electrically communicates with the diagnostic port 62. Therefore, the REU 60 electrically communicates with the vehicle communication bus 44' via the diagnostic port 62. It is contemplated that the REU 60 is portable and may be easily connected to, and disconnected from, the diagnostic port 62, similar to the RDU™ diagnostic tool available from Bendix Commercial Vehicle Systems LLC.

In this embodiment, the signal receiving component 34' is included on the REU 60. Although the signal receiving component 34' is illustrated on the REU 60, it is to be understood that a signal receiving component 34 (see FIG. 1) may or may not be included on the dash switch module 20 (see FIG. 1). As discussed above, the signal receiving component 34' may be an antenna that receives the RF status signals from the at least one tire sensor 32'.

The REU 60 also includes a processor 36', which receives the status signals from the signal receiving component 34'. As discussed above with reference to the first embodiment, the processor 36' generates a remote electronic unit signal message based on the transmitted status signal. The remote electronic unit signal message corresponds to the dash switch module signal message discussed above with reference to the first embodiment. The processor 36' then transmits the remote electronic unit signal message to the vehicle ECU 42'. It is contemplated that the processor 36' transmits the remote electronic unit signal message to the vehicle ECU 42' via the diagnostic port 62 and the vehicle communication bus 44.

As discussed above with reference to the first embodiment, it is also contemplated in the second embodiment that the processor 36' wirelessly transmits the remote electronic unit signal message to the vehicle ECU 42'.

Figure 3:
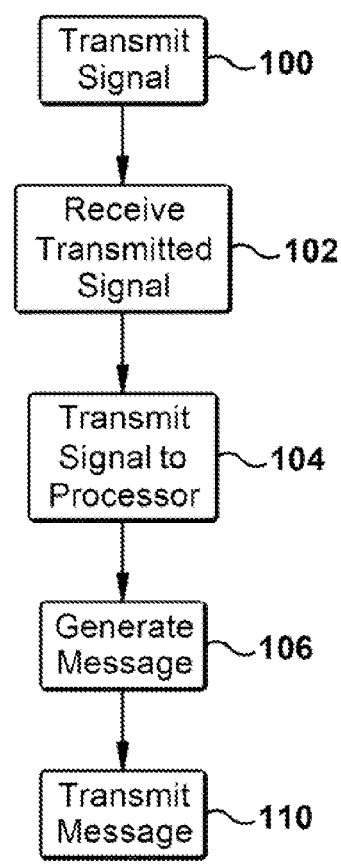
FIG. 3 is an exemplary methodology of transmitting a status signal to a vehicle electronic control unit in accordance with one embodiment illustrating principles of the present invention.

With reference to FIG. 3, an exemplary methodology of the systems shown in FIGS. 1 and 2 for transmitting a status signal from a tire sensor 32, 32' to a vehicle ECU 42, 42' is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the an that elements embodied as software may be implemented using various programming approaches such as machine language, procedural, object-oriented or artificial intelligence techniques. It will further be appreciated that, if desired and appropriate, some or all of the software can be embodied as part of a device's operating system.

In a step 100, at least one of the sensors 32, 32' transmits the transmitted signal, which indicates the status of the respective tire 30. The signal receiving component 34, 34' receives the transmitted status signal in a step 102. As discussed above, in one embodiment the signal receiving component 34, 34' wirelessly receives the transmitted status signal in the step 102.

Then, in a step 104, the transmitted status signal is transmitted from the signal receiving component 34, 34' to the processor 36, 36'. As discussed above, in one embodiment the transmitted status signal is transmitted from the signal receiving component 34, 34' to the processor 36, 36' via a wired connection in the step 104.

The processor 36, 36', in a step 106, generates the dash switch module signal message (e.g., the remote electronic unit signal message) based on the transmitted status signal.

The dash switch module signal message (e.g., the remote electronic unit signal message) is transmitted, in a step 110, is transmitted from the processor 36, 36' to the vehicle ECU 42, 42'. As discussed above, in one embodiment the dash switch module signal message (e.g., the remote electronic unit signal message) is transmitted from the processor 36, 36' to the vehicle ECU 42, 42' via a wired connection in the step 110. Furthermore, in another embodiment, the dash switch module signal message (e.g., the remote electronic unit signal message) is transmitted from the processor 36, 36' to the vehicle ECU 42, 42' via a wireless connection in the step 110.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A dash switch module for a vehicle, the dash switch module comprising:
    a controller, activated by an operator of the vehicle for engaging and disengaging a vehicle parking brake, transmitting a parking brake control request message to a vehicle ECU;
    a signal receiving component receiving a transmitted status signal from a sensor on the vehicle indicating a status of a vehicle component; and
    a processor receiving the transmitted status signal from the signal receiving component and generating a dash switch module signal based on the transmitted status signal, the processor transmitting the dash switch module signal to the vehicle electronic control unit.

2. The dash switch module as set forth in claim 1, wherein:
    the vehicle component is a tire of the vehicle; and
    the transmitted status signal from the sensor indicates the status of the tire.

3. The dash switch module as set forth in claim 2, wherein: the status of the tire includes at least one of a pressure of the tire and a temperature of the tire.

4. The dash switch module as set forth in claim 1, wherein: the signal receiving component wirelessly receives the transmitted status signal from the sensor.

5. The dash switch module as set forth in claim 4, wherein: the signal receiving component is an antenna.

6. The dash switch module as set forth in claim 1, wherein: the vehicle electronic control unit is external to the dash switch module.

7. The dash switch module as set forth in claim 1, wherein:
    the processor transmits the dash switch module signal to a vehicle communication bus; and
    the vehicle electronic control unit receives the dash switch module signal from the communication bus.

8. The dash switch module as set forth in claim 1, wherein: the processor wirelessly transmits the dash switch module signal to the vehicle electronic control unit.

9. The dash switch module as set forth in claim 1, wherein: the dash switch module signal is a J1939 formatted signal.

10. The dash switch module as set forth in claim 9, wherein:
    the dash switch module signal is a proprietary formatted signal.

11. The dash switch module as set forth in claim 1, wherein:
    the controller transmits an electronic signal for controlling a vehicle parking brake.

12. The dash switch module as set forth in claim 1, wherein:
    the dash switch module is positioned at least one of in and proximate to a vehicle dashboard.

13. A portable remote electronic unit for a vehicle, the portable remote electronic unit, comprising:
    an electronic connector, removably connected with a diagnostic port of the vehicle, communicating with a vehicle electronic control unit via the diagnostic port;
    a signal receiving component receiving a transmitted status signal from a sensor on the vehicle indicating a status of a vehicle component; and
    a processor receiving the transmitted status signal from the signal receiving component and generating a remote electronic unit signal based on the transmitted status signal, the processor transmitting the remote electronic unit signal to the vehicle electronic control unit via the electronic connector.

14. The portable remote electronic unit as set forth in claim 13, wherein:
    the vehicle component is a tire of the vehicle; and
    the transmitted status signal from the sensor indicates the status of the tire.

15. The portable remote electronic unit as set forth in claim 13, wherein:
    the processor generates a message based on the remote electronic unit signal; and
    the processor transmits the remote electronic unit signal to the vehicle electronic control unit in the form of the message.

16. The portable remote electronic unit as set forth in claim 15, wherein:
    the electronic connector includes an electrical connector electrically communicating with a vehicle communication bus; and
    the electronic connector communicates the message from the processor to the vehicle electronic control unit via the vehicle communication bus.

17. The portable remote electronic unit as set forth in claim 15, wherein:
    the message is a J1939 formatted message.

18. The portable remote electronic unit as set forth in claim 13, wherein:
    the electronic connector includes a radio-frequency transmitting device that wirelessly transmits the remote electronic unit signal to the vehicle electronic control unit.

19. The portable remote electronic unit as set forth in claim 18, wherein:
    the processor generates a message based on the remote electronic unit signal; and
    the processor wirelessly transmits the remote electronic unit signal to the vehicle electronic control unit in the form of the message.

20. The portable remote electronic unit as set forth in claim 13, wherein:
    the signal receiving component wirelessly receives the transmitted status signal from the sensor.

21. The portable remote electronic unit as set forth in claim 20, wherein:
    the signal receiving component is an antenna.

22. A dash switch module for a vehicle, the dash switch module comprising:
    a controller, activated by an operator of the vehicle for engaging and disengaging a vehicle parking brake, transmitting a parking brake control request message to a vehicle ECU;
    means for receiving a transmitted status signal from a sensor on the vehicle indicating a status of a vehicle component; and
    a processor receiving the transmitted status signal from the means for receiving and generating a dash switch module signal based on the transmitted status signal, the processor transmitting the dash switch module signal to the vehicle electronic control unit.

23. The dash switch module as set forth in claim 22, wherein:

the means for receiving wirelessly receives the transmitted signal from the sensor.

24. The dash switch module as set forth in claim 22, wherein:
the processor transmits the dash switch module signal to the vehicle electronic control unit via a wired connection.

25. The dash switch module as set forth in claim 24, wherein:
the processor transmits the dash switch module signal to the vehicle electronic control unit via a vehicle communication bus.

26. The dash switch module as set forth in claim 22, wherein:
the processor wirelessly transmits the dash switch module signal to the vehicle electronic control unit.

27. A method for transmitting a status signal to a vehicle electronic control unit, the method comprising:
transmitting a transmitted status signal, indicating a status of a vehicle component, from a sensor on the vehicle;
receiving the transmitted status signal by a signal receiving component of a dash switch module, the dash switch module including a controller that is capable of being activated by an operator of the vehicle for engaging and disengaging a vehicle parking brake;
transmitting the transmitted status signal from the signal receiving component to a processor of the dash switch module;
generating a dash switch module signal based on the transmitted status signal; and
transmitting the dash switch module signal from the processor to the vehicle electronic control unit.

28. The method for transmitting a status signal to a vehicle electronic control unit as set forth in claim 27, wherein:
the step of transmitting the transmitted status signal from the sensor includes:
wirelessly transmitting the transmitted status signal from the sensor; and
the step of receiving the transmitted status signal by the signal receiving component includes:
wirelessly receiving the transmitted status signal by the signal receiving component.

29. The method for transmitting a status signal to a vehicle electronic control unit as set forth in claim 27, wherein:
the step of generating a dash switch module signal based on the transmitted status signal includes:
generating a message based on the transmitted status signal; and
the step of transmitting the dash switch module signal from the processor to the vehicle electronic control unit includes:
transmitting the message from the processor to the vehicle electronic control unit via a vehicle communication bus.

* * * * *